(12) United States Patent
Nagashima

(10) Patent No.: US 6,413,023 B1
(45) Date of Patent: Jul. 2, 2002

(54) INDEXABLE TYPE ROTARY MILLING TOOL AND INDEXABLE INSERT

(75) Inventor: Yoshimitsu Nagashima, Narita (JP)

(73) Assignee: Hitachi Tool Engineering, Ltd., Tokyo (JP)

( * ) Notice: Subject to any disclaimer, the term of this patent is extended or adjusted under 35 U.S.C. 154(b) by 0 days.

(21) Appl. No.: 09/513,060

(22) Filed: Feb. 24, 2000

(51) Int. Cl.⁷ .................................. B23C 5/02
(52) U.S. Cl. .................. 408/223; 407/407; 407/42; 407/61; 407/113
(58) Field of Search ............... 407/34, 40, 42, 407/47, 48, 53, 61, 113; 408/223, 713

(56) References Cited

U.S. PATENT DOCUMENTS

| | | | |
|---|---|---|---|
| 4,558,975 A | * 12/1985 | Hale | 407/113 |
| 4,889,455 A | * 12/1989 | Karlsson et al. | 408/224 |
| 4,940,369 A | * 7/1990 | Aebi et al. | 407/42 |
| 4,946,318 A | * 8/1990 | David et al. | 407/42 |
| 5,354,156 A | * 10/1994 | von Haas et al. | 408/713 |
| 5,486,073 A | * 1/1996 | Satran et al. | 407/42 |
| 5,788,431 A | * 8/1998 | Bastek | 408/713 |
| 5,893,683 A | * 4/1999 | Johnson | 407/42 |

FOREIGN PATENT DOCUMENTS

| | | |
|---|---|---|
| EP | 0 297 914 | 1/1987 |
| JP | 09-225724 | 2/1997 |
| JP | 10-118901 | 5/1998 |
| WO | WO 94 16847 | 8/1994 |

* cited by examiner

*Primary Examiner*—Daniel W. Howell
(74) *Attorney, Agent, or Firm*—Darby & Darby

(57) ABSTRACT

An indexable type rotary cutting tool (1) has at least one indexable inserts (3, 6). The indexable insert (3, 6) has a main cutting edge (7) and an outer peripheral cutting edge (9). The main cutting edge (7) ranges from 3 to 35 degrees in cutting edge angle, and the main cutting edge (7) is shaped like and arc or a substantially arc, and the outer peripheral cutting edge (8) is shaped like a straight line, an arc, or a substantially arc so as to be back-tapered with respect to a center axis of the tool.

11 Claims, 4 Drawing Sheets

| | CUTTING NUMBER OF TIMES (STAGE) | 1000<br>0.25 | 2000<br>0.5 | 3000<br>0.75 | 4000 F (mm/min)<br>1.0 fz (min/tooth) | |
|---|---|---|---|---|---|---|
| EMBODIMENT | FIRST STAGE | ⊚ | ⊚ | ⊚ | ⊚ | GOOD |
| | SECOND STAGE | ⊚ | ⊚ | ⊚ | ⊚ | GOOD |
| | THIRD STAGE | ⊚ | ⊚ | ⊚ | ⊚ | GOOD |
| PRIOR ART | FIRST STAGE | ⊚ | ⊚ | ⊚ | ⊚ | GOOD |
| | SECOND STAGE | △ | △ | | ✕ | LARGE CHATTERING-VIBRATION |
| | THIRD STAGE | △ | △ | | ✕ | LARGE CHATTERING-VIBRATION |

INDEXABLE TYPE ROTARY MILLING TOOL AND INDEXABLE INSERT

BACKGROUND OF THE INVENTION

1. Field of the Invention

The present invention relates to an indexable type rotary milling tool and an indexable insert used therefor.

2. Description of the Related Art

Conventionally, there have been dominantly used indexable type rotary cutting tools using indexable inserts each designed in a triangular shape, a rectangular shape, a rhombus shape or the like. In these tools, the main cutting edge is of a straight cutting edge type. A feed per one tooth as a general cutting condition is equal to 0.1 to 0.5 mm/tooth for casting-cutting and 0.1 to 0.3 mm/tooth for steel-cutting although it is varied according to depth and width of cut. However, such examples begin to appear that the use of an indexable type rotary cutting tool using a button insert implements the working at a feed which is not less than about two times as large as a straight cutting edge, thereby resulting in enhancement of the working efficiency. This indexable type rotary cutting tool uses button positive type inserts including various sizes of 8 to 20 mm$\phi$. The clamping mechanisms therefor are broadly classified into two kinds, one kind being designed to fix the insert by pieces of a wedge and a supporter, and the other being designed to fix the insert by a fastening screw inserted into a pin hole disposed at the center of the insert.

Further, the button insert is slightly large in cutting resistance because of its shape-dependent characteristic, but longer in length of the cutting edge than the straight cutting edge, and further high in insert strength; thereby providing many advantages of making it possible to cut a high hardness material, and then lengthening the lifetime of the insert, etc. As an example using such a button insert is proposed tools as described in Japanese Laid-open Patent Application (Kokai) Nos. 9-225724 and 10-118901.

However, in recent high efficiency working (contour line working), such cases begin to appear that chattering-vibration is caused during a process of cutting the corner portions and the grooves, thereby finally causing the inserts to be damaged.

SUMMARY OF THE INVENTION

It is therefore an object of the present invention to suppress the chattering-vibration during the cutting process of the corner portions and the grooves to thereby realize a stable and high efficiency working (contour line working).

In order to attain the above object, according to a first aspect of the present invention, there is provided an indexable type rotary milling tool having at least one indexable insert, characterized in that the indexable insert has a main cutting edge and an outer peripheral cutting edge (9), the main cutting edge ranges from 3 to 35 degrees in cutting edge angle ($\kappa$) and is shaped like an arc or a substantially arc, and the outer peripheral cutting edge is shaped like a straight, an arc, or a substantially arc so as to be back-tapered with respect to the center axis of the tool.

Further, according to another aspect of the present invention, there is provided an indexable insert shaped like a substantial rectangle and having a pin hole and a relief angle, characterized in that the indexable insert is of a two-corner-used type, and shaped like a point-symmetry with respect to the center of the pin hole, each of two sides symmetrical with respect to the center of the pin hole, out of four sides forming the substantial rectangle, is shaped like a straight line, an arc or a substantially arc. Each of the other sides out of the four sides comprises an arc portion (7) shaped like an arc or a substantially arc, and a straight portion continuing from the arc portion, a line segment extending from the arc-center of the arc portion to the connecting point between the arc portion and the straight portion intersects to the straight portion at an angle ($\alpha$) of less than 90 degrees.

Besides, according to another aspect of the present invention, there is provided an indexable insert shaped like a triangle and having a pin hole and a relief angle, characterized in that each of three sides forming the substantial triangle comprise an arc portion shaped like an arc or a substantially arc and a straight portion continuing from the arc portion, a line segment extending from an arc-center of the arc portion to the connecting point between the arc portion and the straight portion intersects to the straight portion at an angle ($\alpha$) of less than 90 degrees.

According to the invention, the substantial length of the cutting edge during a cutting process is substantially constant, thereby resulting in a smooth facing and engraving, which provides a high efficient working. This results in enhancement of the efficiency of the contour line working.

In the indexable type rotary milling tool according to the present invention, a bottom edge serve as a main cutting edge. The main cutting edge ranges from 3 to 35 degrees in cutting edge angle, and is rounded in a radius-round shape. This tool carries out cutting only at a rounded portion in the neighborhood of the tip thereof and hence is shorter in the length of the cutting edge than the conventional button insert. This shortens a substantial length of the cutting edge contacting to the material to be cut in the cutting process for the corner portions and the grooves which are small in the draft of the mold and large in cutting stock, thereby preventing occurrence of the chattering-vibration and thus implementing a stable use of the tool without trouble. The smaller the cutting edge angle of the main cutting edge is, the more smooth the cut face is. If the cutting edge angle is less than 3 degrees, the axial direction-wise depth of cut is reduced, resulting in degradation of the efficiency and obstruction to the practical use. On the other hand, if the cutting edge angle exceeds 35 degrees, the main cutting edge is substantially shortened, resulting in reduction of the lifetime of the insert. More preferably, the cutting edge angle ranges from 10 to 30 degrees.

The main cutting edge preferably ranges from 3 to 7 mm in length. The reason why is that, e.g. in a case where the material to be cut, equivalent to carbon steel S50C is cut at a feed per one tooth (fz) of 1 to 1.2 mm/tooth, if the length is less than 3 mm, the insert is likely to be defected and thus the lifetime thereof is shortened, whereas if the length exceeds 7 mm, the cutting resistance is excessively increased. Therefore, it is preferable that radius of curvature R is increased and that the length is set to 3 to 7 mm.

Generally, it is recommended that the length of the main cutting edge is set to 20 to 60% of the diameter of the inscribed circle in the insert. Moreover, so long as the main cutting edge are rounded at both ends thereof even if it is shaped like a straight line, it has substantially the same characteristic. Therefore, if the main cutting edge is shaped like a straight line and then rounded in proper quantity at both end thereof, the insert is enabled to be formed at a low cost, although the lifetime is slightly degraded.

Moreover, in the indexable insert used for this tool, it is preferable that a line segment extending from an arc-center of the main cutting edge (arc portion) 7 to the connecting point between the main cutting edge 7 and an inner peripheral cutting edge (straight portion) 8 intersects to the inner peripheral cutting edge 8 at an angle of less than 90 degrees (α in FIGS. 2 and 4). This is because the angle exceeding 90 degrees makes it difficult to set the main cutting edge within the range from 3 to 35 degrees in cutting edge angle and arrange the inner peripheral cutting edge at a suitable angle when the insert is mounted to the holder. Besides, the insert may be an indexable insert which is of a substantially rectangular and two-corner-used type, and shaped like a point-symmetry with respect to the center of the pin hole (See FIG. 2). Further, the insert may be an indexable insert which is of a substantially triangular and three-corner-used type, and has the straight portion 8 and the arc portion 7 (See FIG. 4).

The above and other objects, features, and advantages of the invention will more apparent from the following detailed description taken in:conjunction with the accompanying drawings.

DETAILED DESCRIPTION OF THE PREFERRED EMBODIMENTS

Preferred embodiments according to the present invention will be described hereunder with reference to the accompanying drawings.

Figure 1:
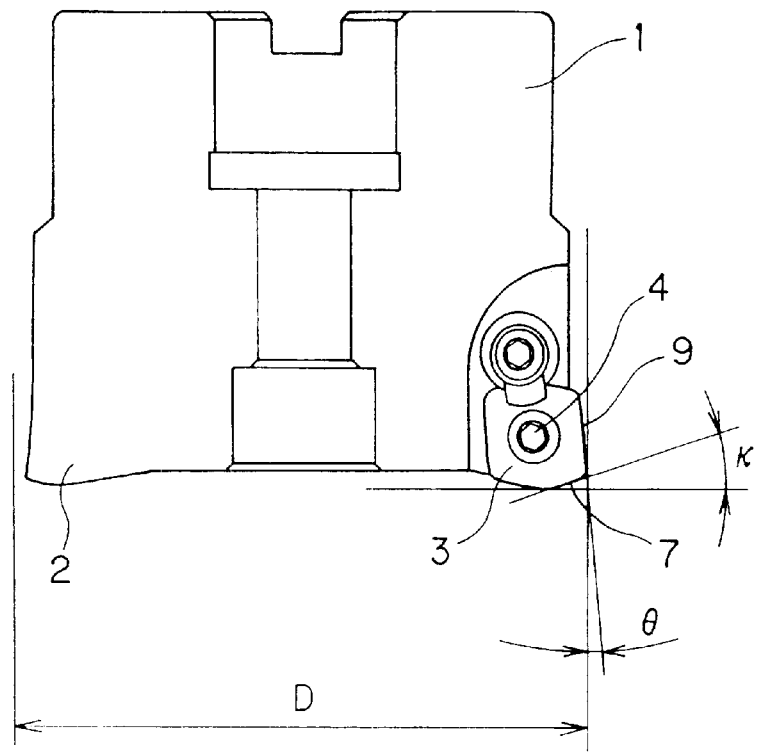
FIG. 1 is a partial sectional view of an indexable type rotary milling tool 1 according to the present invention.
Figure 2:
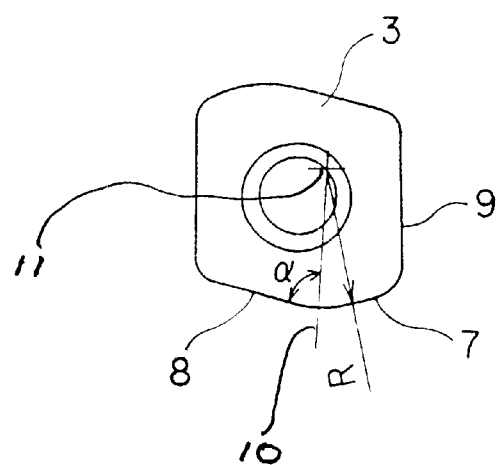
FIG. 2 is a front view of an indexable insert according to an embodiment which is mounted to the tip portion of the indexable type rotary milling tool 1 shown in FIG. 1.
Figure 3:
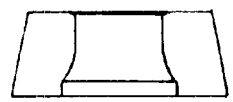
FIG. 3 is a side view of the indexable insert.

FIG. 1 shows a tool main body 1 to which an insert 3 according to the present invention is mounted, and FIG. 2 shows a substantially rectangular insert 3 which is an embodiment of an indexable insert according to the present invention. FIG. 3 is a side view of the insert 3 shown in FIG. 2.

As shown in FIG. 1, the rectangular insert 3 shown in FIG. 2 according to the first-embodiment of the invention is fixed to a distal end portion 2 of the tool main body 1 shown in FIG. 1 by inserting a set screw 4 through a pin hole of the insert. Alternatively, clamping of the insert 3 with a wedge may provide the'same performance as is the case of the fixing of the insert 3 with the set screw 4.

As shown in FIG. 1, the insert 3 of the first embodiment has a main cutting edge 7 and an outer peripheral cutting edge 9. The main cutting edge 7 is designed in an arcuate or substantially arcuate shape so that the cutting edge angle (κ) thereof is within the range from 3 to 35 degrees. The outer peripheral cutting edge 9 is designed in a straight, arcuate or substantially arcuate shape so as to be back-tapered with respect to the center axis of the tool.

The indexable insert 3 of this embodiment is also designed like a point-symmetry with respect to the center of the pin hole thereof so as to use two corners thereof. Each of two sides 9 which are symmetrical with respect to the center of the pin hole in the four sides forming the substantial rectangle is shaped like a straight line, an arc or a substantial arc. Each of the other sides comprises an arc potion (main cutting edge) 7 shaped like an arc or a substantially arc, and a straight portion 8 continuing from the arc portion. As shown in FIG. 2, a line segment extending from the center of the arc of the arc portion 7 to the connecting point between the arc portion 7 and the straight portion 8 intersects to the straight portion 8 at an angle (α) which is less than 90 degrees.

The length of the main cutting edge 7 is preferably set to 3 to 7 mm, however, the present invention is not limited to this value. Further, when the main cutting edge 7 is shaped like a straight line, it is rounded in proper quantity at both ends thereof.

Figure 4:
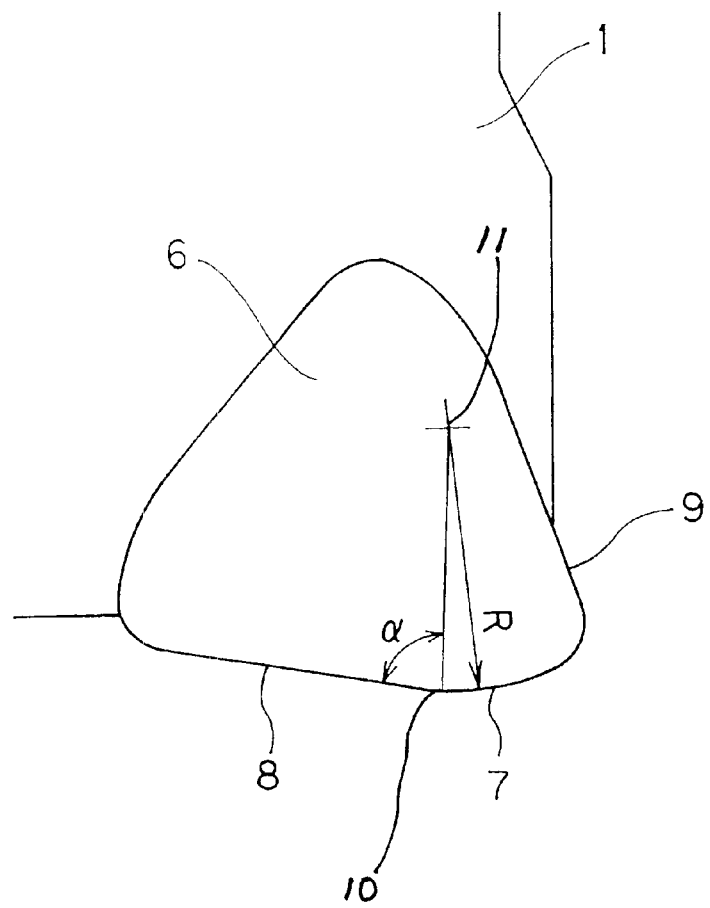
FIG. 4 is a front view of an indexable insert according to another embodiment of the invention.

Further, FIG. 4 shows a substantially triangular insert 6 according to second embodiment of the present invention.

Each of the three sides forming the substantial triangle comprises an arc portion 7 shaped like an arc or a substantially arc, and a straight potion 8 continuing from the arc potion 8. In this embodiment, a line segment extending from the arc-center 11 of the arc portion 7 to the connecting point 10 between the arc portion 7 and the straight portion intersects to the straight portion at an angle (α) which is less than 90 degrees.

The above structure of the insert 6 of the second embodiment provides a three-corner-used and indexable insert.

Figure 5:
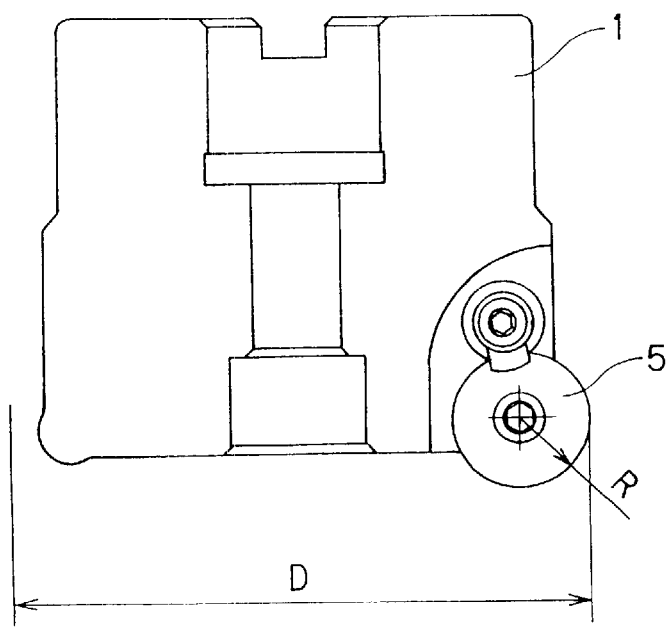
FIG. 5 is a front view of a cutter using an indexable insert of a conventional example.
Figure 6:
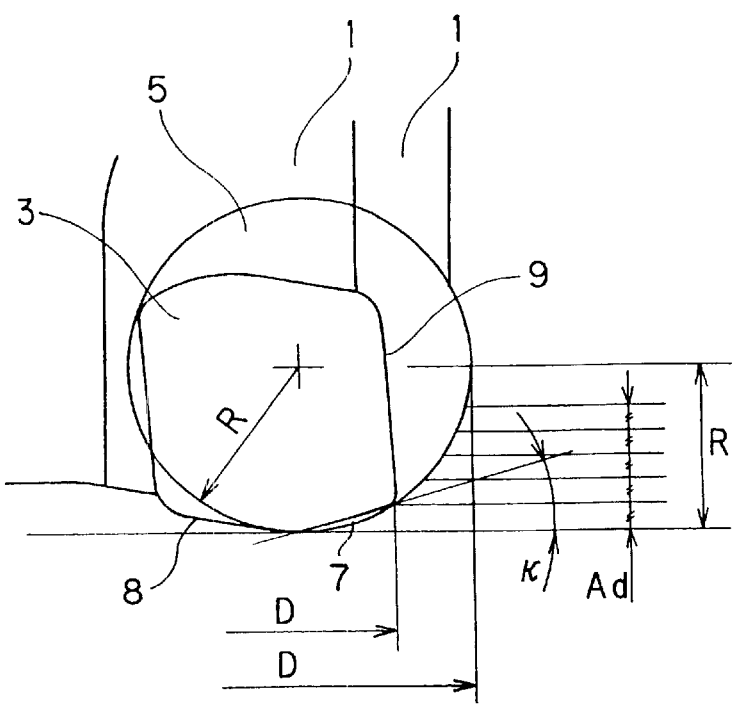
FIG. 6 is a view useful in explaining the deference between the indexable insert according to the embodiment of the present invention and that of the conventional example, both of which repeat cutting during contour line working.

FIG. 5 shows a radius cutter using a conventional button insert. FIG. 6 is a view useful in explaining the difference between the conventional button insert and the rectangular insert of the first embodiment of the invention.

Figures 7, 8:
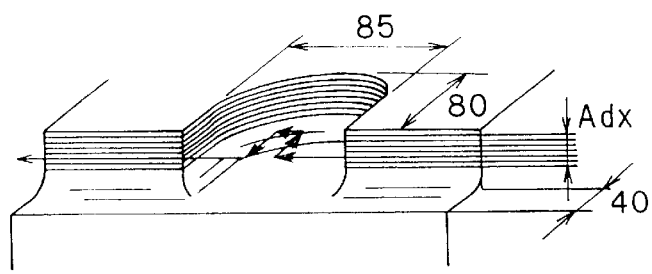
FIG. 7 is a view useful in explaining a manner of carrying out contour line working by the embodiment of the invention.
FIG. 8 is view useful in explaining the cutting results of the embodiment of the invention and the conventional example.

Next, the comparison test was carried out under the condition that contour lines were engraved as indicated by arrows in FIG. 7. A tool of 80 mmφ was attached to a cutter arbor while the overhang length L over a gauge line was set to 270 mm so as to make it easy to induce the chattering-vibration. Further, the material was worked in the order of shoulder-cutting, groove-cutting, shoulder-cutting, . . . so as to set the working condition so that the insert was easily defected in the cutting process of the groove. Further test conditions were given as follows: the material to be cut was made of S50C as is the case of a cutting test 1, the cutting speed V was set to 200 m/mmn (number of revolution N=800 rpm), depth of cut Ad was set to 1.5 mm, width of cut Rd was set to 40 (shoulder-cutting) to 80 (groove-cutting), and the cutting style was set to a dry cutting style. The feed per one tooth (fz) was increased while observing the cut condition. That is, the feed per one tooth (fz) was increased in turn in the order of 0.25, 0.5, 0.75, 1.0 mm/tooth, while the cut condition was evaluated from the viewpoint of vibration. Moreover, these fz values will come to 1000, 2000, 3000, 4000 mm/min in terms of the table feed amount F.

The test results are shown in FIG. 8, in which a mark ⊙ shows "good", a mark Δ shows "passable", a mark X shows "cutting-impossible". FIG. 8 shows that in the conventional example, the working is available at the first stage of the contour lines without problems, the chattering-vibration is increased at the second stage and the subsequent stages (the depth of cut Ad is not less than 3 mm.(depth of cut per one stage 1.5 mm×2 times) and the working is not available when the feed per one tooth is equal to 0.75 mm. The third stage had the same result as the second stage. On the other hand, in the embodiments of the present invention, the material was subjected to satisfactory working over all the region in which the feed per one tooth fz is 0.25 to 1.00 mm at the first stage, and also to satisfactory engraving-working through the second, the third, and the fourth stage also, without the chattering-vibration.

The reason why such a satisfactory result is obtained will be described with reference to the schematic view of FIG. 6.

With respect to the conventional button insert 5, as the depth of cut (Ad) is increased by 1.5 mm at one time, the length of the cutting edge contacting to the material to be cut is increased. In other words, in the conventional example, as the depth of cut Ad is increased like Ad×n-times (cutting number of times) during the contour line working, the length of the main cutting edge contacting to the material is increased.

On the contrary, in the embodiments of the invention, the length of the main cutting edge 7 is set to a value nearly equal to the depth of cut Ad for one time, which enables the main cutting edge to cut the material without changing its length at the second stage and the subsequent stages also. In other words, in the embodiment of the invention, attention is paid to the length of the main cutting edge which is set such that the k chattering-vibration is not caused at the first stage, and this length of the main cutting edge is set. Therefore, even when the engraving working is carried out at any frequency, no chattering-vibration occurs, and thus a stable working can be performed.

Expressing numerically in concrete terms, so long as the machine horse power is allowed even if the cutter is not so big, when cutting the material of S50C on the condition that five teeth of 80 mmφ are provided, the cutting speed V is 180 m/min (number of revolution N is equal to 720 rpm), the depth of cut Ad is set to 1.5 mm, the width of cut Rd is for groove-cutting, and the feed of one tooth fz is set to 1 mm/tooth, there could be provided a tool which has the capacities, such as the table feed amount F of 3600 mm/min and the maximum metal removal rate of 432 cc/min, and on the condition that the feed per one tooth is 2 mm/tooth, there could be provided a tool which has the capacities, such as the table feed amount F is 7200 mm/min and the maximum metal removal rate of 864 cc/min. Taking into consideration that such a cutting process that the metal removal rate exceeds 200 cc/min is conventionally called "heavy cutting (high efficient working)", the metal removal rate in the embodiments of the invention can exceeds two times of 200 cc/min, which shows the superiority of the embodiments of the invention to the conventional example.

According to the invention, the substantial length of the cutting edge during a cutting process is substantially constant, thereby resulting in a smooth facing and engraving, which provides a high efficient working. This results in enhancement of the efficiency of the contour line working.

What is claimed is:

1. An indexable type milling tool having a plurality of indexable inserts, wherein:
   each of said indexable inserts is substantially shaped like a rectangle, has a pin hole and is symmetrical with respect to a center of said pin hole, two symmetrical sides of the four sides which form each of said indexable insert being shaped like one of a straight line and an arc, while each of another two symmetrical sides of the four sides comprises an arc portion and a straight portion continuing from said arc portion,
   and wherein:
   each of said other two symmetrical sides of each of said indexable insert is set as an outer peripheral cutting edge while said arc portion of each of said other two symmetrical sides is set as a main cutting edge and said straight portion thereof is set as an inner peripheral cutting edge, and said main cutting edge has a cutting angle (K) which ranges from 3 to 35 degrees.

2. The indexable type rotary cutting tool as claimed in claim 1, wherein said main cutting edge ranges from 3 to 7 mm in length.

3. The indexable type rotary cutting tool as claimed in claim 1, wherein said main cutting edge is shaped like a straight line, and is sufficiently rounded at both ends thereof.

4. The indexable type milling tool as claimed in claim 1, wherein a line segment extending from an arc-center of said arc portion to a connecting point between said arc portion and said straight portion intersects said straight portion at an angle (∝) of less than 90 degrees.

5. The indexable type milling tool as claimed in claim 2, wherein a line segment extending from an arc-center of said arc portion to a connecting point between said arc portion and said straight portion intersects said straight portion at an angle (∝) of less than 90 degrees.

6. An indexable type milling tool having plural indexable inserts, wherein:
   each of said plural indexable inserts is substantially shaped like a triangle and has a pin hole;
   each side forming each of said plural indexable inserts comprises an arc portion and a straight portion continuing from said arc portion; and
   said arc portion of each of said sides is set as a main cutting edge while said straight portion thereof is set as an inner peripheral cutting edge and
   said main cutting edge has a cutting angle (K) which ranges from 3 to 35 degrees.

7. The indexable type rotary cutting tool as claimed in claim 6, wherein said main cutting edge ranges from 3 to 7 mm in length.

8. The indexable type milling tool as claimed in claim 1, wherein a line segment extending from an arc-center of said arc portion to a connecting point between said arc portion and said straight portion intersects said straight portion at an angle (alpha) of less than 90 degrees.

9. The indexable type milling tool as claimed in claim 1, wherein said main cutting edge is shaped like a straight line, and a connecting portion between said main cutting edge and each, of said inner peripheral cutting edge and said outer peripheral cutting edge is rounded.

10. The indexable type milling tool as claimed in claim 1, wherein said outer peripheral cutting edge is back-tapered with respect to a center axis of said tool.

11. The indexable type milling tool as claimed in claim 8, wherein said outer peripheral cutting edge is back-tapered with respect to a center axis of said tool.

* * * * *